(12) United States Patent
Seo et al.

(10) Patent No.: US 11,945,521 B2
(45) Date of Patent: Apr. 2, 2024

(54) DEVICE FOR LOCATING NOISE IN STEERING SYSTEM

(71) Applicant: HYUNDAI MOBIS, Co., Ltd., Seoul (KR)

(72) Inventors: Jae Yong Seo, Yongin-si (KR); Gue Hwan Nam, Seongnam-si (KR); Hyeon Cheol Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 604 days.

(21) Appl. No.: 17/135,503

(22) Filed: Dec. 28, 2020

(65) Prior Publication Data

US 2021/0370904 A1    Dec. 2, 2021

(30) Foreign Application Priority Data

May 27, 2020    (KR) .......................... 10-2020-0063820

(51) Int. Cl.
*B62D 5/04*    (2006.01)
*B62D 15/02*    (2006.01)
*G06F 18/213*    (2023.01)
*G06F 18/214*    (2023.01)
*G06N 3/08*    (2023.01)
*G06V 10/44*    (2022.01)
*G06V 10/82*    (2022.01)

(52) U.S. Cl.
CPC ....... *B62D 5/0481* (2013.01); *B62D 15/0205* (2013.01); *G06F 18/213* (2023.01); *G06F 18/214* (2023.01); *G06N 3/08* (2013.01); *G06V 10/454* (2022.01); *G06V 10/82* (2022.01)

(58) Field of Classification Search
CPC ...... G06V 10/82; G06V 10/454; G06N 3/084; G06N 3/08; G06N 3/045; B62D 15/0205; B62D 5/0481; B62D 5/0457; G06F 18/213; G06F 18/217; G06F 18/214; G06F 2218/04
USPC .......................................................... 700/94
See application file for complete search history.

(56) References Cited

U.S. PATENT DOCUMENTS 9,185,506 B1 * 11/2015 Deng ................... G10K 11/175
10,288,474 B2    5/2019 Schumacher
(Continued)

FOREIGN PATENT DOCUMENTS

CN    102853899    1/2013
CN    105473988    4/2016
(Continued)

OTHER PUBLICATIONS

DE 102015007242 A1; Date Published Dec. 8, 2016; Friedmann Felix.*

(Continued)

*Primary Examiner* — Melur Ramakrishnaiah
(74) *Attorney, Agent, or Firm* — H.C. Park & Associates, PLC

(57) ABSTRACT

A device for locating a noise occurring in a steering system includes: a sound receiving unit detecting noise occurring in a steering system; a processing unit inputting data on the noise in the steering system into a neural network model that performs learning in advance and locating a position or a component at which the noise occurs in the steering system, the noise being detected by the sound receiving unit; and a storage unit in which the neural network model that performs the learning in advance is stored.

12 Claims, 6 Drawing Sheets

(56) References Cited

U.S. PATENT DOCUMENTS

| | | | |
|---|---|---|---|
| 10,573,301 B2 | 2/2020 | Kupryjanow et al. | |
| 11,161,542 B2 | 11/2021 | Naik et al. | |
| 2018/0120264 A1* | 5/2018 | Sato | G01M 17/007 |
| 2019/0049989 A1* | 2/2019 | Akotkar | G05D 1/0088 |
| 2019/0379975 A1* | 12/2019 | Murata | H04R 5/027 |
| 2020/0151514 A1* | 5/2020 | Liu | G06V 10/7747 |
| 2021/0210099 A1* | 7/2021 | Wander | G10L 15/32 |

FOREIGN PATENT DOCUMENTS

| | | |
|---|---|---|
| CN | 109410976 | 3/2019 |
| CN | 109993280 | 7/2019 |
| CN | 110068795 | 7/2019 |
| CN | 110341788 | 10/2019 |
| CN | 110481635 | 11/2019 |
| CN | 110503971 | 11/2019 |

OTHER PUBLICATIONS

Chinese Office Action dated Jul. 15, 2023, in Chinese Patent Application No. 202011601055.X.

* cited by examiner

DEVICE FOR LOCATING NOISE IN STEERING SYSTEM

CROSS REFERENCE TO RELATED APPLICATION

This application claims priority from and the benefit of Korean Patent Application No. 10-2020-0063820, filed on May 27, 2020, which is hereby incorporated by reference for all purposes as set forth herein.

BACKGROUND

Field

Exemplary embodiments relate to a device for locating a noise in a steering system of a vehicle and, more particularly, to a device for locating a noise in a steering system, which is capable of locating, using a neural network model, a position or a component at which noise occurs in a steering system.

Discussion of the Background

A steering system of a vehicle is a system that adjusts a traveling direction of a vehicle according to a driver's turning of a steering wheel. In recent years, power steering systems that augment the driver's effort needed to turn the steering wheel using a motive force of a motor have been widely used. Examples of these power steering systems include a Motor Driven Power Steering (MDPS) system and an Electric Power Steering (EPS) system.

Such power steering systems using the motive force of the motor fundamentally include a motor, a steering box, a torque sensor, and an electronic control unit (ECU). The electronic control unit detects a rotational force of the steering wheel through a torque sensor and controls a torque of the steering wheel by applying electric current to the motor according to a speed of the vehicle. The steering gearbox receives a motive force through a steering shaft, converts a rotation direction, and drives front wheels through an arm including a relay rod, a tie rod, a knuckle arm, and the like.

The power steering system uses a decelerator, a column, a joint, and the like to appropriately transfer the motive force of the motor. Various abnormal sounds or noises occur in connecting portions of these components or in these components themselves.

In the related art, noise experts use a method that analyzes an abnormal sound or noise using an expensive analysis apparatus, in order to locate a position or a component at which the abnormal sound or noise occurs in the steering system. More specifically, in a method in the related art, the abnormal sound or noise in the steering system is reproduced, the noise expert makes an estimation of a position of the abnormal sound or noise, a sensor is mounted on the position, and a sensing value of the sensor is analyzed.

In the method in the related art, the noise expert makes the estimation on the basis of his/her personal determination. The capability of analyzing the abnormal sound or noise varies among noise experts. Accordingly, there is a high likelihood that an erroneous repair will be made. In addition, it takes much time to directly mount the sensor on a component at which the abnormal sound or noise is estimated to occur and to reproduce the abnormal sound or noise for analysis. Furthermore, in the related art, the noise analysis cost becomes excessive because an analysis is made of every component at which the abnormal sound or noise is estimated to occur.

The foregoing is intended merely to aid in the understanding of the background of the present invention, and is not intended to mean that the present invention falls within the purview of the related art that is already known to those skilled in the art.

The above information disclosed in this Background section is only for enhancement of understanding of the background of the invention and, therefore, it may contain information that does not constitute prior art.

SUMMARY

Exemplary embodiments provide a device for locating a noise in a steering system, which is capable of simply collecting an abnormal sound or noise in the steering system through a sound receiving unit (i.e., a microphone) using a neural network model, inputting collected information into the neural network model experiencing learning, and thereby locating a position or a component at which the abnormal sound or noise occurs in the steering system.

Additional features of the invention will be set forth in the description which follows, and in part will be apparent from the description, or may be learned by practice of the invention.

According to at least one embodiment, there is provided a device for locating a noise occurring in a steering system, the device including: a sound receiving unit detecting noise occurring in a steering system; a processing unit inputting data on the noise in the steering system into a neural network model and locating a position or a component at which the noise occurs in the steering system, the noise being detected by the sound receiving unit; and a storage unit in which the neural network model is stored. The neural network model may perform learning based on input data received beforehand.

In the device, the processing unit may perform pre-processing of converting the time-domain data on the noise in the steering system into frequency-domain data, the noise being detected by the sound receiving unit, and may input the pre-processed data into the neural network model.

In the device, the processing unit may perform pre-processing of applying a Mel-Frequency Cepstrum Coefficient (MFCC) technique to the data on the noise in the steering system and extracting a frequency feature of the noise in the steering system, the noise being detected by the sound receiving unit, and may input the pre-processed data into the neural network model.

In the device, the processing unit may perform pre-processing of generating an image resulting from converting the time-domain data on the noise in the steering system into frequency-domain data, the noise being detected by the sound receiving unit, and may input the image generated by the pre-processing into the neural network model.

In the device, the processing unit may perform pre-processing of applying an MFCC technique to the data on the noise in the steering system, extracting a frequency feature of the noise in the steering system, and generating the extracted frequency feature as an image, the noise being detected by the sound receiving unit, and may input the image generated by the pre-processing into the neural network model.

In the device, the processing unit may input a region of the image generated by the pre-processing into the neural network model.

In the device, the neural network model may be a convolution neural network model including a convolution layer, a pooling layer, and a fully connected layer.

In the device, the convolution layer may perform filtering on the image generated by the pre-processing using a filter, may perform convolution computation, and may create a feature map, in order to extract a feature of the image generated by the pre-processing, the pooling layer may extract a representative value for each region from the feature map created by the convolution layer and may reduce a size of the feature map, the fully connected layer may further emphasize the features and may categorize the emphasized features, using an activation function, and regarding the noise in the steering system, the output layer may locate and output the position or the component at which the noise occurs, on the basis of a result of the categorization by the fully connected layer.

In the device, the processing unit and the storage unit may be implemented in the form of a tablet personal computer (PC).

With the device for locating the noise in the steering system, when the noise occurring in the steering system is detected through the sound receiving unit and audio data on the detected noise is input in the neural network model, a result of locating the position or the component at which the abnormal sound or noise occurs in the steering system can be obtained. Thus, the analysis time for noise diagnosis can be greatly reduced.

In addition, with the device for locating the noise in the steering system, a noise expert or a noise diagnosis device is not necessary for locating the noise in the vehicle. Furthermore, there is no need to replace components at which the noise is estimated to occur, in which the components are replaced one by one to locate the position or the component at which the noise occurs. Thus, the cost for locating the noise can be reduced. The frequency of unnecessary or erroneous repair can thereby be reduced.

According to at least one embodiment, there is provided a method of locating a noise occurring in a steering system, which includes: receiving, from a sound receiving device, noise occurring in the steering system and converting the noise into a stream of data representing the noise; inputting, by a processing unit, the stream of data representing the noise into a data analysis mode that is capable of performing learning in advance; and performing, by the data analysis model, analysis of the stream of data representing the noise, and locating a position or a component at which the noise occurs in the steering system.

Effects that are accomplished according to the present invention are not limited to those described above, and effects that are not described above will be apparent to a person of ordinary skill in the art from the following description.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
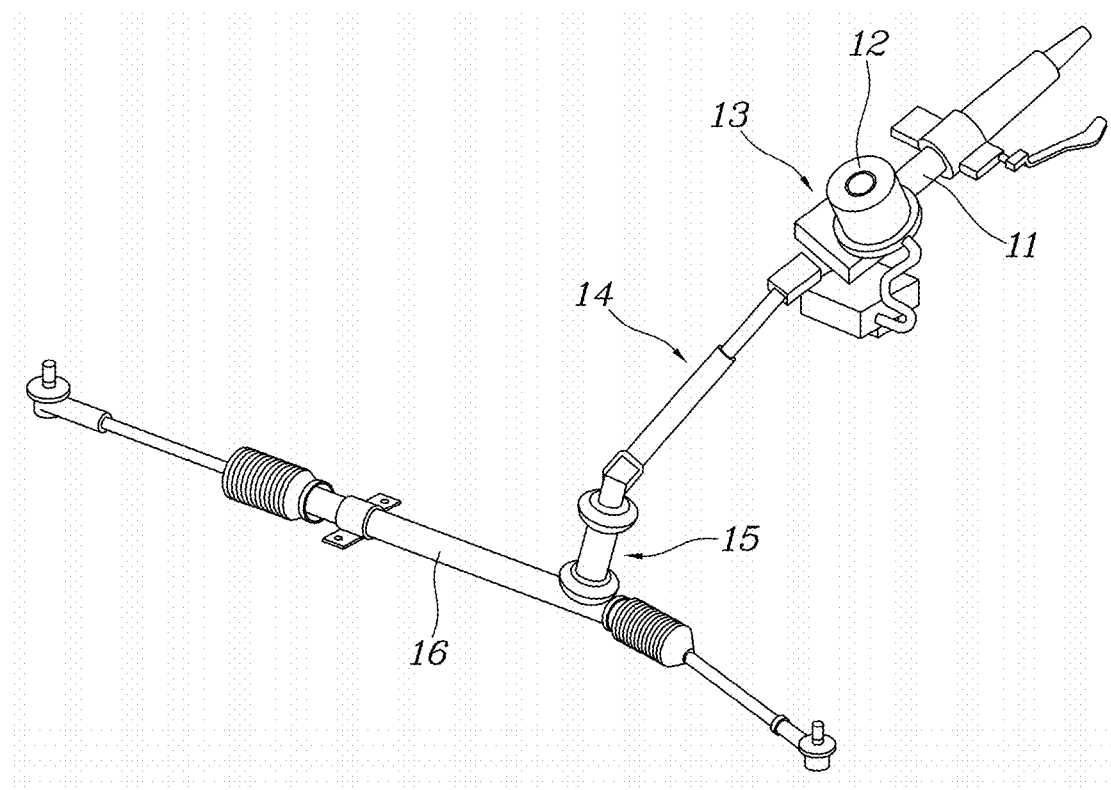
FIG. 1 is a view schematically illustrating a steering system to be diagnosed for locating an abnormal sound or noise by a device for locating a noise in a steering system.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

A device for locating a noise in a steering system according to various embodiments will be described in detail below with reference to the accompanying drawings.

Firstly, a device for locating the noise in the steering system according to at least on embodiment establishes a neural network model for locating a position or a component at which an abnormal sound/noise occurs in the steering system made up of components. Then, the device enables the neural network model to perform learning using learning data that includes the abnormal sound or noise in the steering system and a position at which the abnormal sound or noise occurs. The abnormal sound or noise in the steering system is collected through a microphone or other type of sound receiving unit or sound receiving component. Then, the device inputs data on the abnormal sound or noise in the steering system to be diagnosed for locating an abnormal sound or noise into the neural network model experiencing the learning. Lastly, the device enables the neural network model to locate the position of abnormal sound/noise on the basis of the abnormal sound/noise data that is input.

FIG. 1 is a view schematically illustrating a steering system to be diagnosed for locating the abnormal sound or noise by a device for locating a noise in a steering system;

The steering system in FIG. 1 is a steering system in which so-called column mounted motor driven power steering (C-MDPS) finds application. In such a steering system, the motor unit 12 for power steering is mounted on a steering column 11. FIG. 1 illustrates the steering system in which the C-MDPS finds application, which is only one of various steering systems in which the present invention finds application. The present invention is not limited to the steering system in FIG. 1.

With reference to FIG. 1, when a driver turns a steering wheel, a torque sensor measures a torque generated by the driver and transfers a measurement value of the torque to a steering system controller. When the steering system controller controls the motor unit 12 in such a manner as to generate a steering force corresponding to the measured torque, the motor unit 12 generates the steering force to be exerted on the steering column 11. The steering force generated by the motor unit 12 is transferred to a gearbox 16 through a link bar including a universal joint 14. A rack-and-pinion mechanism within the gearbox 16 converts rotational motion into linear motion, thereby steering a vehicle.

In this structure of the steering system, the abnormal sound or noise occurs primarily in a decelerator 13 provided to the motor unit 12, the universal joint 14, a yoke 15 supporting a rack bar within the gearbox 16, and the like.

According to an embodiment, the data on the abnormal sound or noise occurring in the steering system and information on the position or the component at which the abnormal sound or noise occurs are collected in advance, and are used as learning data for enabling the neural network model to perform the learning.

Figure 2:
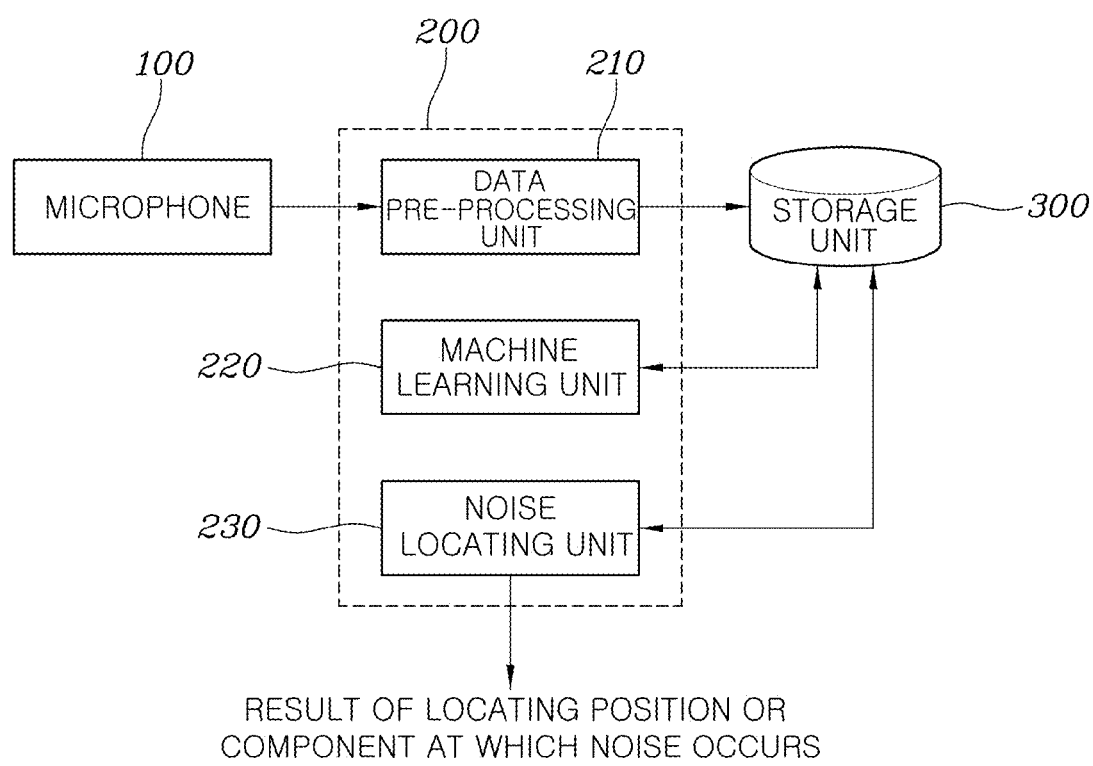
FIG. 2 is a block diagram illustrating the device for locating the noise in the steering system according to an embodiment.

FIG. 2 is a block diagram illustrating the device for locating the noise in the steering system according to an embodiment.

With reference to FIG. 2, the device for locating the noise in the steering system according to an embodiment includes a microphone 100, a processing unit 200, and a storage unit 300. The microphone 100 detects the abnormal sound or noise occurring in the steering system. The processing unit 200 applies the abnormal sound or noise in the steering system, which is detected in the microphone 100, to the neural network model that performs the learning in advance, and locates the position or the component at which the detected abnormal sound or noise occurs in the steering system. The neural network model that performs the learning in advance is stored in the storage unit 300.

The microphone 100 is a means for detecting the abnormal sound or noise occurring in the steering system. A low-cost microphone that is readily obtainable, or an expensive high-performance microphone, may be used because the microphone 100 only needs to be able to detect the abnormal sound or noise that occurs when operating the steering system in a testing field, such as at a vehicle service center.

The processing unit 200 may include a data pre-processing unit 210. The data pre-processing unit 210 converts the data on the abnormal sound or noise collected in the microphone 100 into a format appropriate for learning by the neural network model or for application to the neural network model.

The processing unit 200 primarily performs two types of functions. First, the processing unit 200 enables the neural network model for locating the position at which the abnormal sound or noise occurs in the steering system, to perform the learning. Second, the processing unit 200 applies the data on the noise in the steering system to be diagnosed for locating the abnormal sound or noise to the neural network model that performs the learning, and locates the position or the component at which the abnormal sound or noise occurs in the steering system to be diagnosed for locating the abnormal sound or noise.

To this end, the processing unit 200 may include a machine learning unit 220 and a noise locating unit 230. The machine learning unit 220 performs various types of computation and processing necessary for the learning by the neural network model. The noise locating unit 230 applies the abnormal sound or noise in the steering system to the neural network model that performs the learning and performs various types of computation and processing necessary for locating the position at which the abnormal sound or noise occurs.

The neural network model, which is used for locating the position or the component at which the abnormal sound or noise occurs in the steering system, is stored in the storage unit 300. Furthermore, the learning data that is used for machine learning by the neural network model, particularly, the learning data that results from the conversion by the data pre-processing unit 210 of the processing unit 200, are stored in the storage unit 300. In addition to these, various data required for the learning by the neural network mode and for the application to the neural network mode are stored in the storage unit 300.

Data Pre-Processing

The data pre-processing unit 210 of the processing unit 200 performs pre-processing that converts learning data and actually measured noise data on a component into appropriate formats. The learning data is input for the learning by the neural network model for locating the noise in the steering system. The actually measured noise data on the component is to be input into the neural network model.

The data that are input into the data pre-processing unit 210 are the data on the abnormal sound or noise collected by the microphone 100, in the steering system. The data on the abnormal sound or noise collected by the microphone 100 are data expressed in a time domain. First of all, the data pre-processing unit 210 converts the time-domain abnormal sound or noise data into frequency-domain abnormal sound or noise data. In this process, the data pre-processing unit 210 applies a Mel-Frequency Cepstrum Coefficient (MFCC) technique capable of extracting a feature of audio data.

Figure 3:
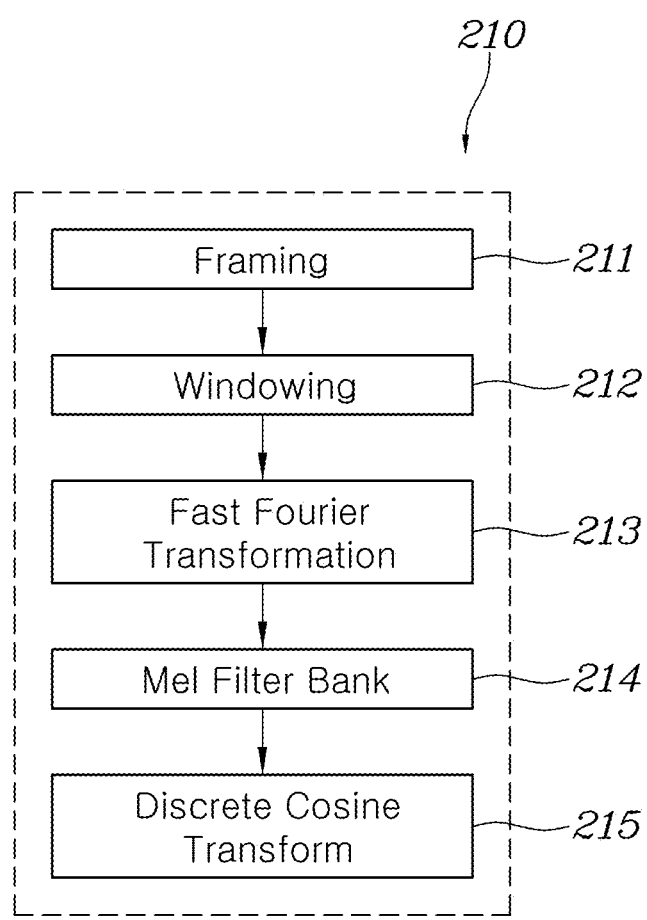
FIG. 3 is a flowchart illustrating operation of a data pre-processing unit of the device for locating the noise in the steering system according to an embodiment.

FIG. 3 is a flowchart illustrating operation of the data pre-processing unit 210 of the device for locating the noise in the steering system according to an embodiment. The flowchart in FIG. 3 illustrates steps of applying the MFCC technique to the data on the noise detected in the microphone 100, in the steering system, and of extracting and imaging a frequency-domain feature.

The audio data are not non-stationary data (i.e., it may have different frequency domain characteristics over time). Thus, the data pre-processing unit 210 performs framing (Step 211) and windowing (Step 212) for the conversion into the frequency domain for a short time for which the audio data are regarded as being stationary. Sizes of the framing and the windowing (Steps 211 and 212) are approximately tuned using an experimental method.

Subsequently, the data pre-processing unit 210 performs a Fast Fourier Transform (FFT) on each frame (Step 213).

Figure 4:
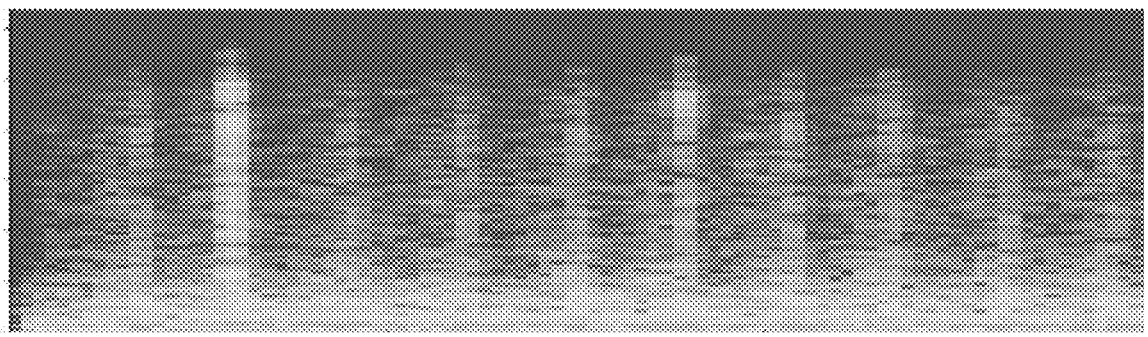
FIG. 4 is a graph showing an example of a spectrogram showing a result of Fast Fourier Transform by the data pre-processing unit of the device for locating the noise in the steering system according to an embodiment.

FIG. 4 is a graph showing an example of a spectrogram showing a result of the FTT by the data pre-processing unit 210 of the device for locating the noise in the steering system according to an embodiment.

A horizontal axis of the spectrogram in FIG. 4 represents a time (frame) and a vertical axis thereof represents a frequency. The intensity of a white color indicates a magnitude of a frequency at each time.

Subsequently, the data pre-processing unit 210 applies a Mel Filter bank to the result of the FFT (Step 214), performs Discrete Cosine Transform (DCT) on a result of the filtering by the Mel filter bank, and finally creates the spectrogram showing a frequency feature (Step 215).

Figure 5:
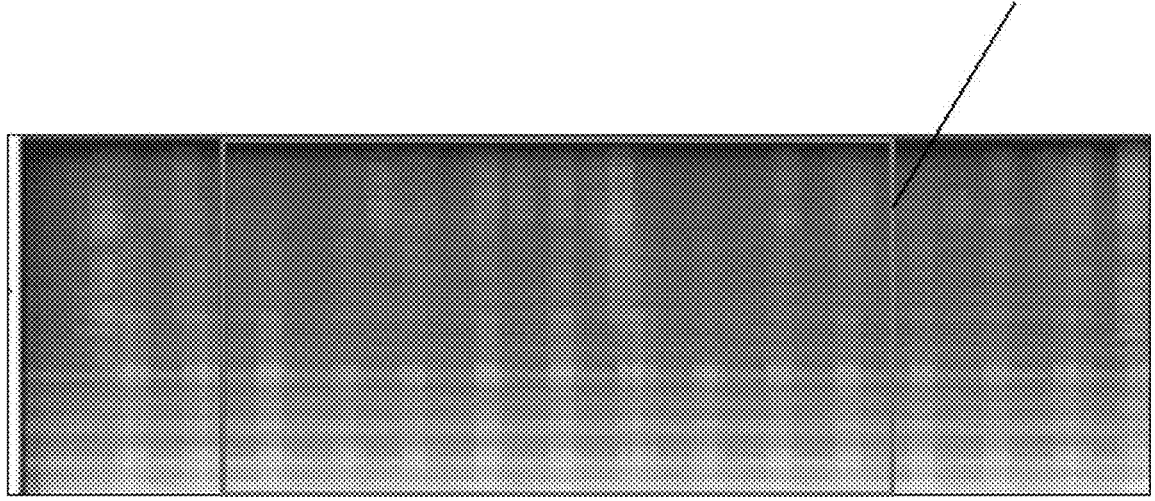
FIG. 5 is a graph showing an example of a spectrogram generated finally by the data pre-processing unit of the device for locating the noise in the steering system according to an embodiment.

FIG. 5 is a graph showing an example of the spectrogram generated finally by the data pre-processing unit 210 of the device for locating the noise in the steering system according to an embodiment.

A horizontal axis of the spectrogram in FIG. 5 represents a time (frame) and a vertical axis thereof represents a frequency. The intensity of a white color indicates a magnitude of a frequency at each moment in time.

From the above description, it is understood that the MFCC technique is applied in all steps from the steps of framing and windowing the data on the noise that is input from the microphone 100 to the steps of finally performing the DCT and outputting the result of the DCT.

The data pre-processing unit 210 determines a region A of the spectrogram showing the frequency feature derived by applying the MFCC technique, as a region to be input into the neural network model. An image of the region A of the spectrogram, which is formed by the pre-processing, is formed in the storage unit 300. A size of the region A here is appropriately tuned using an experimental method.

Machine Learning by the Neural Network Model

The machine learning unit 220 is an element that enables the neural network model stored in the storage unit 300 to perform the learning.

The data used for the learning by the neural network model include the data on the noise collected by the microphone 100, in the steering system, and data on the position or the component at which the noise occurs in the steering system.

That is, data to be input for the learning are the data on the noise collected by the microphone 100, and data to be output for the learning are the data on the position or the component that the noise occurs in the steering system. Particularly, the data to be input for the learning is an image of the region A of the spectrogram generated by the data pre-processing unit 210.

The learning data including the data to be input for the learning and the data to be output for the learning are collected through testing on various steering systems, and the like.

Figure 6:
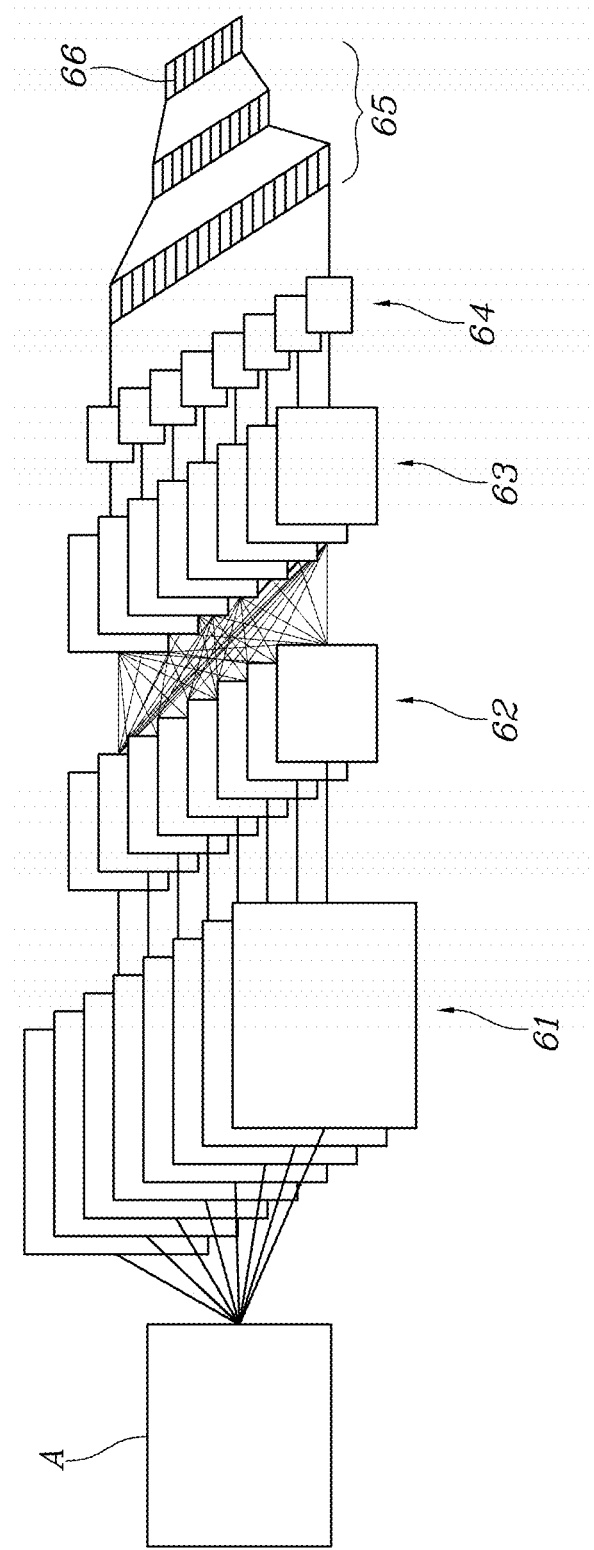
FIG. 6 is a view illustrating an example of a neural network model that is applied to the device for locating the noise in the steering system according to an embodiment that uses a neural network model.

FIG. 6 is a view illustrating an example of a neural network model that may be applied to the device for locating the noise in the steering system according to an embodiment that uses the neural network model.

With reference to FIG. 6, the neural network model that is applied to the device for locating the noise in the steering system according to the embodiment is implemented as a convolution neural network (CNN) that includes convolution layers 61 and 63, pooling layers 62 and 64, a fully connected layer 65, and an output layer 66.

The convolution layers 61 and 63 perform filtering on an input image A using a filter to extract a feature of the input image generated by the data pre-processing unit 210, performs convolution computation, and creates a feature map. For example, k feature maps are created with k filters. The filter takes on an appropriate initial value as a numerical value (weighting factor) at the outset and thereafter changes to an appropriate value through learning.

The pooling layers 62 and 64 extract a representative value for each region from the feature maps created by the convolution layers 61 and 63. The pooling layers 62 and 64 perform max-pooling, average-pooling, or the like, and thus reduces a size of the feature map and reduces an amount of computation as much as they reduce the size of the feature. In the max-pooing, filtering is performed on the feature map using a filter and a maximum value of a region thereof on which the filtering is performed is determined as a representative value. In the average-pooling, filtering is performed on the feature map using a filter and an average value of a region thereof on which the filtering is performed is determined as a representative value.

In an example in FIG. 6, two convolution layers, the convolution layers 61 and 63, two pooling layers, the pooling layers 62 and 64 are illustrated but the number of the convolution layers and the number of the pooling layers may be increased or decreased whenever necessary.

The feature map that is output to the pooling layer 64 goes through a flattening process and then is input into the fully connected layer 65. The flattening process is a process of converting a two-dimensional feature map, which is output from the pooling layer 64, into a one-dimensional feature map. Features of nodes included in the fully connected layer 65 are further emphasized and categorized using an activation function. The categorized features thereof are transferred to the output layer 66. Regarding the abnormal sound or noise in the steering system, the output layer 66 locates the position or the component at which the noise occurs and outputs a result of the locating.

The neural network model is enabled by the machine learning unit 220 to perform the learning. For example, the machine learning unit 220 enables the neural network model to learn a weighting factor for a connection between the layers of the neural network model or between the nodes, a parameter for a state of the node, and the like through a delta rule and back propagation learning that are typical supervised learning techniques.

After the learning by the neural network model is finished, the machine learning unit 220 stores, in the storage unit 300, various parameters and weighting factors and the like that neural network model retain.

Locating Noise Through the Neural Network Model

The noise locating unit 230, as described above, locates the position or the component at which the noise occurs in the steering system, using the neural network model that performs the learning.

When the microphone 100 detects the noise occurring in the steering system to be diagnosed for locating the abnormal sound or noise, the data pre-processing unit 210 performs pre-processing on the data on the detected noise, generates the spectrogram that is an image showing the frequency feature, and then stores the region A of the spectrogram in the storage unit 300 or provides the region A thereof to the noise locating unit 230.

Subsequently, the noise locating unit 230 inputs pre-processed image data into the neural network model stored in the storage unit 300, performs computation processing on each layer of the neural network model, and outputs a result of the neural network model locating the position or the component at which the noise occurs in the steering system.

Figure 7:
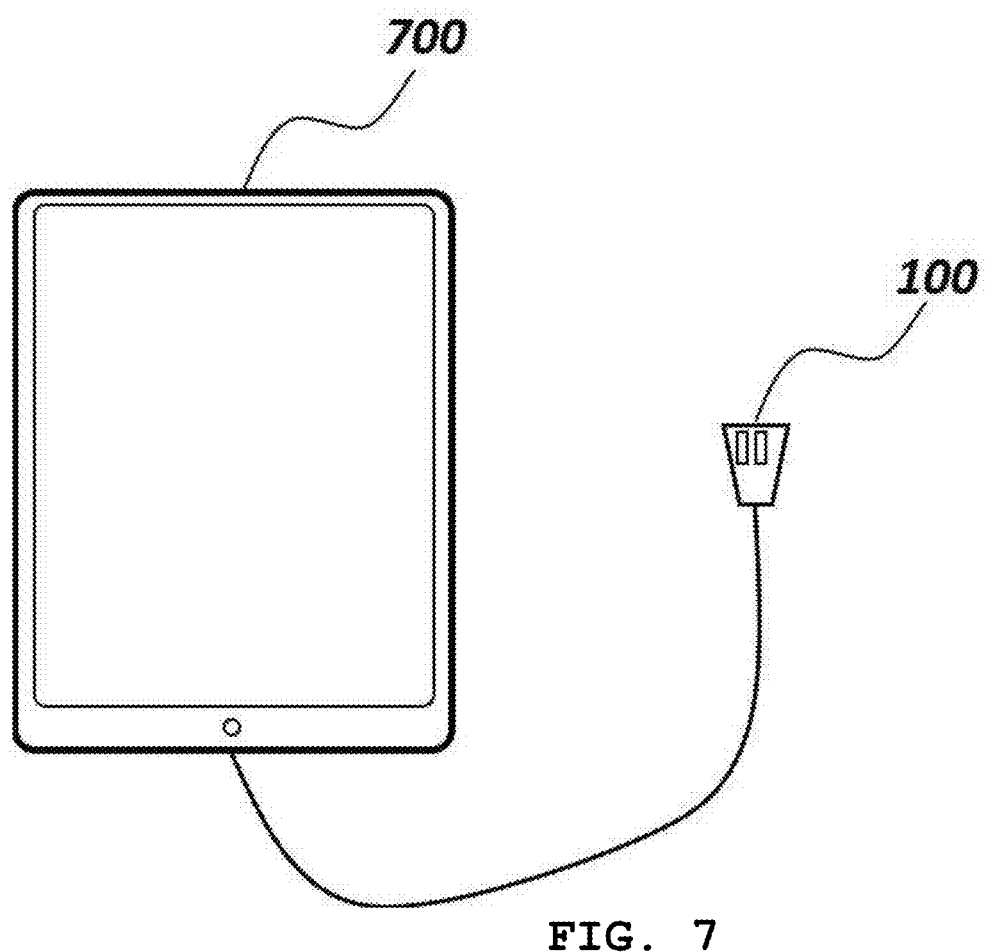
FIG. 7 is a view illustrating an implementation example of the device for locating the noise in the steering system according to an embodiment.

FIG. 7 is a view illustrating an implementation example of the device for locating the noise in the steering system according to an embodiment.

As illustrated in FIG. 7, the device for locating the noise in the steering system according to an embodiment, which is described above, is implemented as a combination of a portable tablet PC 700 and the microphone 100 in the testing field for actually locating the abnormal sound or noise.

A central processing unit (CPU) included in the tablet PC 700 serves as the processing unit 200. A storage device, such as a flash memory, that is included within the tablet PC 700, serves as the storage unit 300.

An application for executing a data pre-processing algorithm and an algorithm for locating the abnormal sound or noise using the learning data, which are described above, is stored in the storage unit 300 within the tablet PC 700. A user executes the application and collects the abnormal sound or noise from a vehicle on which testing is to be performed, through the microphone 100 connected to the tablet PC 700. Thereafter, the application is caused to execute the data pre-processing algorithm and the algorithm for locating the abnormal sound or noise. Thus, the position, the component, and the like at which the abnormal sound or noise occurs in the steering system of a real-world vehicle can be located.

More specifically, the application records the abnormal sound or noise collected in the microphone 100, analyzes the abnormal sound or noise, and displays a pattern of the abnormal sound or noise. Furthermore, the application executes the algorithm for locating the abnormal sound or noise, which is implemented by the machine learning and thus locates the position, the component, and the like at which the abnormal sound or noise occurs.

The device for locating the noise in the steering system according to embodiments, which are described above, may be implemented as various computing devices. Particularly, the device for locating the noise in the steering system according to one or more embodiments may also be implemented as a personal terminal (a smartphone) equipped with all of a microphone, a memory, and a processor. The learning by the neural network model requires a large amount of computation. Thus, a high-performance computing device enables the neural network model to perform learning. The neural network model that performs the learning and the algorithm for performing the pre-processing are stored in a personal terminal. With this personal terminal, a position or a component at which an abnormal sound or noise occurs in a steering system can be immediately located in a vehicle manufacturing line, a service center, or the like.

As described above, when a noise occurring in a steering system of a vehicle is detected through a microphone and then audio data on the detected noise is only input into a neural network model, the device for locating the noise in the steering system according to one or more embodiments can acquire a result of locating a position or a component at which an abnormal sound or noise occurs in the steering system, and thus the time for noise diagnosis can be remarkably reduced. In addition, a noise expert or a noise diagnosis device is not necessary to locate a noise in the steering system. Furthermore, there is no need to replace components at which the noise is estimated to occur, with such replacement being tediously performed one by one to locate a position or a component at which the noise occurs. Thus, the cost for locating the noise can be reduced. Furthermore, the frequency of unnecessary or erroneous repair can be reduced.

Although exemplary embodiments have been shown and described hereinabove, the present description is not limited to specific exemplary embodiments described above, but may be various modified by those skilled in the art to which the exemplary embodiments pertain without departing from the scope and spirit of the present invention as disclosed in the accompanying claims. In addition, such modifications should also be understood to fall within the scope and spirit of the present invention.

What is claimed is:

1. A device for locating a noise occurring in a steering system, the device comprising:
   a sound receiving unit configured to detect noise occurring in the steering system;
   a processing unit configured to input data on the noise in the steering system into a neural network model that is configured to perform learning in advance and to locate a position or a component at which the noise occurs in the steering system, the noise being detected by the sound receiving unit; and
   a storage unit in which the neural network model that is configured to perform the learning in advance is stored,
   wherein the processing unit is configured to perform pre-processing of generating an image resulting from converting time-domain data on the noise in the steering system into frequency-domain data, the noise being detected by the sound receiving unit, and to input the image generated by the pre-processing into the neural network model.

2. The device of claim 1, wherein the processing unit is configured to perform pre-processing of converting time-domain data on the noise in the steering system into frequency-domain data, the noise being detected by the sound receiving unit, and to input the pre-processed data into the neural network model.

3. The device of claim 1, wherein the processing unit is configured to perform pre-processing of applying a Mel-Frequency Cepstrum Coefficient (MFCC) technique to the data on the noise in the steering system and to extract a frequency feature of the noise in the steering system, the noise being detected by the sound receiving unit, and to input the pre-processed data into the neural network model.

4. The device of claim 1, wherein the processing unit is configured to input a region of the image generated by the pre-processing into the neural network model.

5. The device of claim 1, wherein the neural network model is a convolution neural network model including a convolution layer, a pooling layer, and a fully connected layer.

6. The device of claim 5, wherein the convolution layer is configured to perform filtering on the image generated by the pre-processing using a filter, perform convolution computation, and create a feature map, in order to extract a feature of the image generated by the pre-processing, the pooling layer is configured to extract a representative value for each region from the feature map created by the convolution layer and reduce a size of the feature map, the fully connected layer is configured to further emphasize the features and categorize the emphasized features, using an activation function, and regarding the noise in the steering system, an output layer is configured to locate and output the position or the component at which the noise occurs, based on a result of the categorization by the fully connected layer.

7. The device of claim 1, wherein the processing unit and the storage unit are implemented in a form of a tablet PC.

8. The device of claim 1, wherein the sound receiving unit comprises a microphone.

9. A device for locating a noise occurring in a steering system, the device comprising:

a sound receiving unit configured to detect noise occurring in the steering system;

a processing unit configured to input data on the noise in the steering system into a neural network model that is configured to perform learning in advance and to locate a position or a component at which the noise occurs in the steering system, the noise being detected by the sound receiving unit; and a storage unit in which the neural network model that is configured to perform the learning in advance is stored, wherein the processing unit is configured to perform pre-processing of applying a Mel-Frequency Cepstrum Coefficient (MFCC) technique to the data on the noise in the steering system, to extract a frequency feature of the noise in the steering system, and to generate the extracted frequency feature as an image, the noise being detected by the sound receiving unit, and to input the image generated by the pre-processing into the neural network model.

10. The device of claim 9, wherein the processing unit is configured to input a region of the image generated by the pre-processing into the neural network model.

11. The device of claim 9, wherein the neural network model is a convolution neural network model including a convolution layer, a pooling layer, and a fully connected layer.

12. The device of claim 11, wherein the convolution layer is configured to perform filtering on the image generated by the pre-processing using a filter, perform convolution computation, and create a feature map, in order to extract a feature of the image generated by the pre-processing, the pooling layer is configured to extract a representative value for each region from the feature map created by the convolution layer and reduce a size of the feature map, the fully connected layer is configured to emphasize the features and categorize the emphasized features, using an activation function, and regarding the noise in the steering system, an output layer is configured to locate and output the position or the component at which the noise occurs, based on a result of the categorization by the fully connected layer.

* * * * *